United States Patent [19]

Brown et al.

[11] Patent Number: 4,757,886
[45] Date of Patent: Jul. 19, 1988

[54] TRANSMISSION CLUTCH CLOSED LOOP SLIP CONTROLLER AND METHOD

[75] Inventors: Larry T. Brown, Westland; Marvin P. Kraska, Dearborn, both of Mich.

[73] Assignee: Ford Motor Company, Dearborn, Mich.

[21] Appl. No.: 5,179

[22] Filed: Jan. 20, 1987

[51] Int. Cl.⁴ .......................... F16D 7/00; F16D 47/02
[52] U.S. Cl. .................................... 192/3.3; 192/3.31; 192/103 F
[58] Field of Search ............... 192/0.032, 0.033, 0.075, 192/0.076, 3.28, 3.29, 3.30, 3.31, 103 F

[56] References Cited

U.S. PATENT DOCUMENTS

| | | | |
|---|---|---|---|
| 4,457,411 | 7/1984 | Hiramatsu | 192/0.076 |
| 4,577,737 | 3/1986 | Niikura et al. | 192/0.032 |
| 4,582,185 | 4/1986 | Grimes et al. | 192/0.076 |
| 4,660,697 | 4/1987 | Yoneda et al. | 192/0.033 |

FOREIGN PATENT DOCUMENTS

1461 1/1985 Japan .................................... 192/3.3

Primary Examiner—Leslie A. Braun
Assistant Examiner—David A. Testardi
Attorney, Agent, or Firm—Frank G. McKenzie; Donald J. Harrington

[57] ABSTRACT

A continuously variable belt-driven transmission includes a hydraulic torque converter, a variable diameter displaceable input pulley, a variable diameter displaceable output pulley, forward and reverse planetary gearing, a differential mechanism and half shafts driven from the differential mechanism. A slipping lockup clutch is hydraulically actuated to connect and disconnect selectively the impeller and turbine of the torque converter. The radial position of the drive belt that engages the input and output pulleys is determined by selectively pressurizing and venting a cylinder to move displaceable sheaves of a pulley. Hydraulically actuated clutches are selectively engageable to produce forward drive or reverse drive from the output pulley to the differential mechanism. Various sensors produce electric signals as input to a microprocessor indicate the position of the engine throttle, the magnitude of engine speed, primary pulley speed, secondary pulley speed, converter lockup clutch pressure, belt load pressure, line pressure and the position of a PRNDL gear selector. A valve body hydraulically actuates, in accordance with the output produced by the computer, the forward clutch, the reverse clutch, the torque converter lockup clutch and the displaceable sheaves of the input pulley and output pulley. An electronic feedback system controls the slip, engagement and disengagement of the torque converter lockup clutch.

12 Claims, 6 Drawing Sheets

TRANSMISSION CLUTCH CLOSED LOOP SLIP CONTROLLER AND METHOD

BACKGROUND OF THE INVENTION

1. Field of the Invention

This invention relates to a system for controlling the operation of a slipping clutch for use in an automatic transmission. More particularly, this invention pertains to such a system for controlling the operation of a lockup clutch in accordance with a clutch slip command signal applied to the winding of a solenoid by an electronic computer control system.

2. Description of the Prior Art

In an automatic transmission having either a startup clutch or a torque converter lockup clutch, the clutch must be applied smoothly to assure imperceptible engagement. After the lockup clutch is applied, vibrations can occur in the driveline at various road speeds because the damping effect of the torque converter in the driveline is eliminated after the torque converter is locked. Sudden changes in the application of the engine throttle, called tip-in and backout, can produce large, unacceptable driveline torque disturbances that are uncomfortable to the passengers of the vehicle, and, if the engine speed is low, lugging can occur.

Conventional drivelines include a single stage or multiple stage damper located in the transmission in series with the engine to suppress tip-in and backout and other noise, vibration and harshness (NVH) disturbances. Although dampers for this purpose have been successful in dealing with these problems, their presence adds cost, complexity and weight to the system.

In electronically controlled transmissions that produce discrete drive ratios or continuously variable, stepless drive ratios, a closed loop control circuit can be employed to smoothly lockup the clutch and control slip across the clutch. It has been found that controlling the slip, can eliminate tip-in and backout NVH and lugging problems. When a control of this type is used, mechanical dampers can be eliminated and the cost and complexity of the system can be reduced.

SUMMARY OF THE INVENTION

The system according to this invention for controlling the operation of a slipping clutch for use in an automotive transmission includes the use of sensors that produce electrical signals representing the engine throttle angle, vehicle speed, slip across the clutch and engine speed. The method is suitable for use with a hydraulically actuated clutch supplied with lockup clutch pressure that causes friction surfaces of the clutch to engage when pressure is applied and to disengage when the clutch is vented. The method employs a strategy expressed in the form of an algorithm that is repetitively executed by an electronic computer during the operation of the motor vehicle to determine whether, according to the strategy, a command for clutch slip control should be initiated. Generally, the strategy includes a comparison of the engine throttle angle and the vehicle speed to determine whether the clutch should be applied and a slip command signal should be initiated. When the command issues, the slip across the clutch is commanded to decrease linearly with time at a rate that depends on the engine throttle angle. When the throttle angle is low, the command slip ramp rate is low. If the throttle angle is high, the command slip is high. The slip decreases in accordance with the time rate established with reference to the throttle angle.

When a signal is produced to start the lockup of the clutch, the final value of the slip across the clutch is determined from a predetermined schedule that sets the final value in accordance with the commanded speed of the output element of the clutch. This commanded speed is determined in accordance with a schedule that varies with the magnitude of the throttle angle. The commanded lockup clutch output speed is a relatively high constant speed when the throttle angle is high and is a relative low constant speed when engine throttle angle is low. Between these extremities, the commanded clutch output speed varies linearly over the midrange of the throttle angle magnitude.

Vibrations associated with noise, vibration and harshness conditions in the driveline can be eliminated or reduced substantially by employing the method of this invention by initiating the command for slip control over the vehicle speed range where these vibrations are determined to be excessive. By properly controlling the slip across the clutch according to the method of this invention, vibrations associated with discrete frequency ranges can be substantially eliminated from the driveline and the lockup clutch of the torque converter can be controlled suitably to produce fuel efficient operation of the vehicle compatible with driveability requirements and operating economy.

In the implementation of this strategy, the lockup clutch is actuated by the application of a pressure signal produced by a flow amplifier valve in accordance with a pilot pressure produced by a variable force solenoid-operated hydraulic valve whose windings are energized with current produced by a VFS valve driver. The slip control signal is processed by a shaping filter whose output is combined with the feedback calculated slip across the clutch to produce an error signal, which is applied to the input of a compensator whose output is combined with an inner feedback signal representing lockup clutch pressure and a previous duty cycle produced by the compensator. This error signal is applied to the input of the VFS valve driver.

DESCRIPTION OF THE PREFERRED EMBODIMENT

Figure 1A:
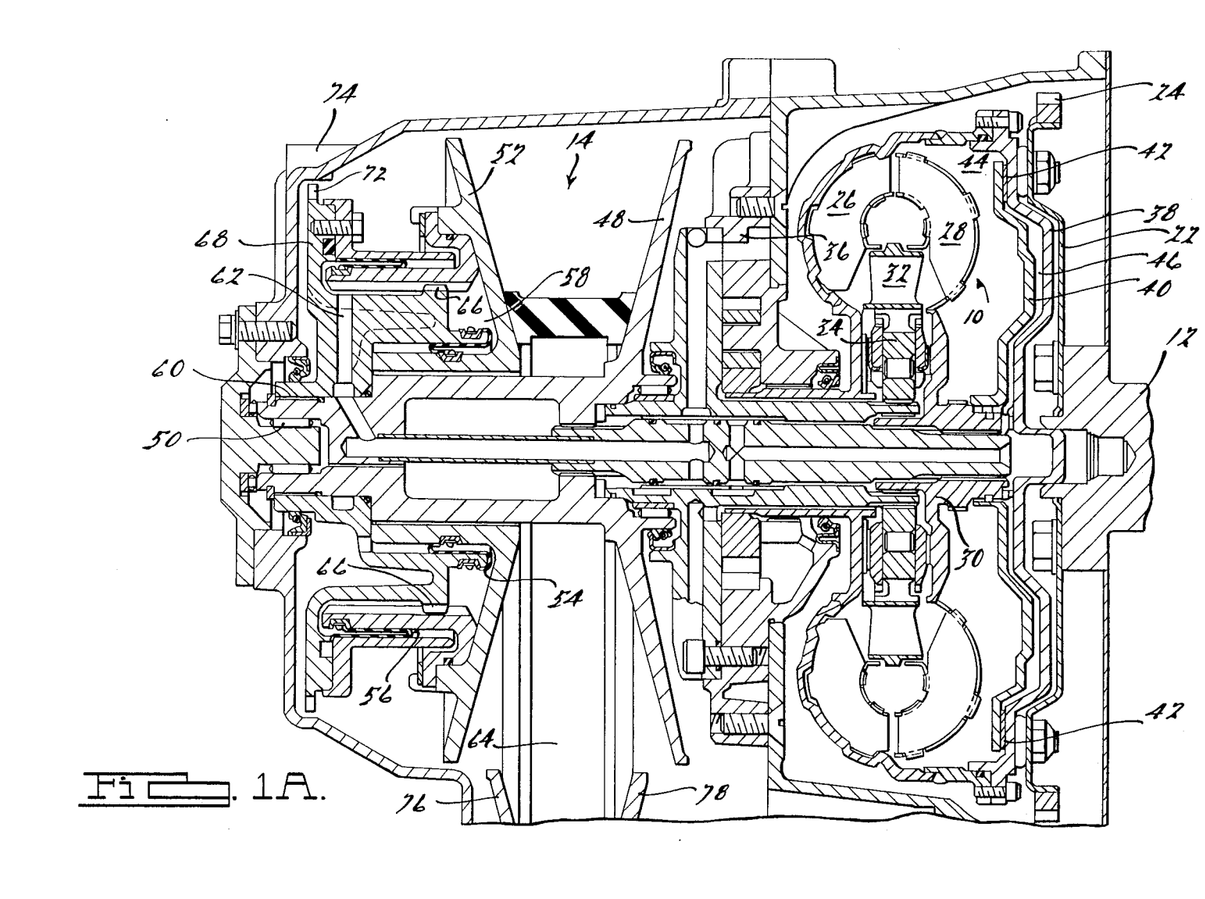
FIGS. 1A and 1B form a schematic diagram of a transmission whose operation is suitably controlled by this invention.
Figure 1B:
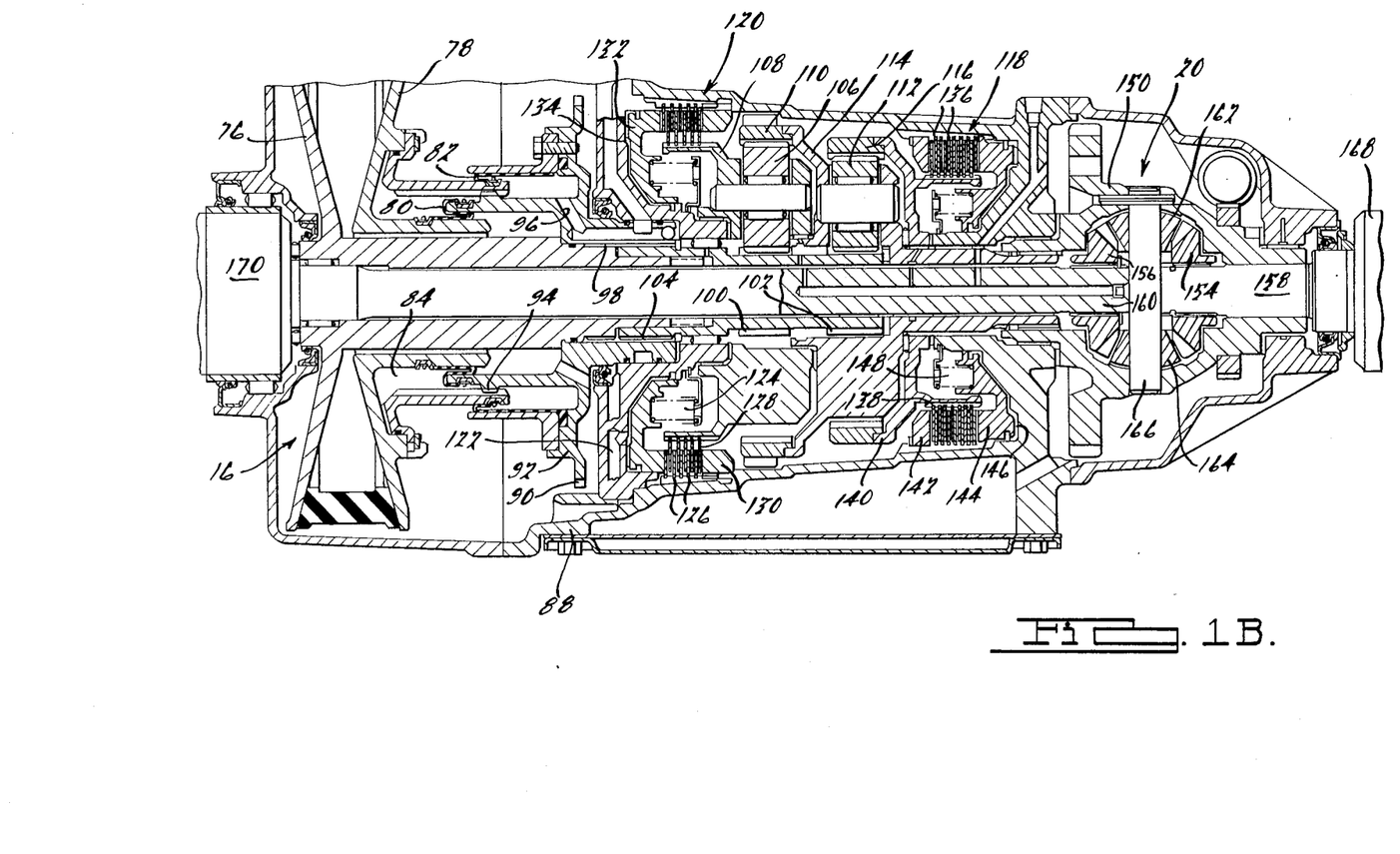

Referring first to FIGS. 1A and 1B, an automatic transmission, in particular a continually variable trnsmission for use in front-wheel drive vehicle whose engine and transmission are transversely mounted, includes a torque converter 10 driveably connected to an engine crankshaft 12, a primary or input variable diameter pulley 14, a secondary or output variable diameter pulley 16, final drive gearing and a differential mechanism 20.

The flywheel 22 fixed to the crankshaft has a starter gear 24 carried on its circumference. The torque converter includes an impeller 26, which is driven mechanically from the crankshaft, a turbine 28 driven hyrodynamically from the impeller and connected mechanically to a shaft 30, and a stator 32 connected by a one-way clutch 34 whose inner surfaces are splined to the rotor of a fixed displacement hydraulic pump 36. When the turbine is driven hydrodynamically from the impeller by the fluid contained in the torque converter, the transmission operates in the converter mode.

The disc 38, which connects the crankshaft to the blades of the impeller 26, and the adjacent disc 40, which is joined by a spline to shaft 30, carry mating friction surfaces and form collectively a lockup or slipping clutch 42 that selectively produces a mechanical connection between impeller 26 and turbine 28 when clutch 42 is engaged, or permits a hydrodynamic drive connection between them when the clutch is disengaged. Lockup clutch pressure supplied to the converter casing in cylinder 44 causes or tends to cause the clutch friction surfaces to driveably engage. Converter feed pressure supplied in passage 46 tends to separate the friction surfaces and allows clutch 42 to slip while some frictional contact is maintained on its friction surfaces, or to entirely disengage the clutch depending upon the magnitude of the hydraulic pressure supplied through line 46 and the opposing effect of the hydraulic pressure within cylinder 44.

The primary pulley 14 includes a fixed sheave 48, which is rotatably mounted on the support surfaces provided on the surface of pump 36 and at a bearing 50 on the transmission case. A displaceable sheave 52 is supported on the outer surface of sheave 48 for sliding movement toward and away from the fixed sheave. Inner and outer flexible diaphragm seals 54, 56, seal hydraulic cylinder 58, which is supplied with hydraulic fluid through passage 62. When cylinder 58 is pressurized, sheave 52 is moved axially toward fixed sheave 48, thereby causing drive belt 64 to move radially outward on sheaves 48, 52. Sheave 52 is connected by a spline 66 to a disc 68 on which is formed angularly spaced teeth 72, which pass in front of a variable reluctance primary pulley speed sensor 74 to produce a signal whose frequency is a measure of the rotational speed of the primary pulley 14.

Drive belt 64 is continually engaged also with the output or secondary pulley 16, which includes a fixed sheave 76 and a displaceable sheave 78. Inner and outer diaphragms seals 80, 82 seal hydraulic cylinder 84, which is selectively pressurized to move sheave 78 toward sheave 76 and vented to permit sheave 78 to move away from sheave 76.

The rotational speed of the output pulley is determined by a signal produced by a variable reluctance speed sensor 88 located so that the teeth 90 on the outer surface of disc 92 pass in front of the speed sensor.

Disc 92 supports on one end the diaphragm seals 80, 82, their other end being supported on displaceable sheave 78. pressurized hydraulic fluid supplied through hydraulic passage 96 flows through spline 94 into cylinder 84 and pressurizes the outer surface of sheave 78, thereby moving drive belt 64 to a greater radial position on the secondary pulley 16 and to a lesser radial position on input pulley 14. Disc 92 is splined at 98 to the fixed sheave and provides driving continuity through spline 94 to sheave 78. Disc 68 is splined at 60 to fixed sheave 48 and at spline 66 to displaceable sheave 52, thereby driveably connecting sheaves 48 and 52.

Sun gears 100 and 102 are formed integrally on a gear wheel that is splined at 104 to the sheaves that form the secondary pulley 16. A first set of planetary pinions 106, rotatably supported on a carrier 108, is in continuous engagement with sun gear 100 and with ring gear 110. A second set of planetary pinions 112, rotatably supported on carrier 114, is in continuous meshing engagement with sun gear 102 and ring gear 116. Ring gear 110 is driveably connected to carrier 114 and ring gear 116 is selectively connected to the casing of the transmission through a forward drive clutch 118. Reverse drive clutch 120 selectively connects carrier 108 to the transmission casing.

Pressurized hydraulic fluid supplied through passage 122 engages reverse drive clutch 120, and spring 124 disengages that clutch. Clutch 120 includes a first set of clutch discs 126 splined to the transmission casing and a second set of discs 128 splined to carrier 108. Pressure block 130 reacts the pressure force developed on the face of the clutch piston 132 when the pressurized hydraulic fluid is admitted to clutch cylinder 134.

Forward drive clutch 118 includes a first set of clutch discs 136 splined to the transmission casing and a second set of clutch discs 138 splined to disc 140, which is fixed to ring gear 116. Pressure block 142 reacts the pressure forces developed on the face of clutch piston 144 when hydraulic fluid is admitted to clutch cylinder 146. Spring 148 driveably disconnects clutch discs 136, 138 when cylinder 146 is vented.

Forward drive results when reverse clutch 120 is vented and forward clutch 118 is pressurized. Then the output pulley 16 drives sun gear 102; ring gear 116 is held and carrier 114 drives the spindle wheel 150 of the differential mechanism 20 through a spline. Reverse drive results when clutch 120 is applied and clutch 118 is disengaged. Then secondary pulley 16 drives sun gear 100, carrier 108 is held, ring gear 110 drives carrier 114 and the differential spindle is driven in the reverse direction through the spline.

Side bevel gears 154, 156, driveably connected to output shafts 158, 160, respectively, are in continuous meshing engagement with bevel gears 162, 164, rotatably supported on the spindle 166. Half shafts 168, 170 drive the axle shafts that carry torque to the drive wheels of the vehicle from output shafts 158, 160, respectively.

Figure 2:
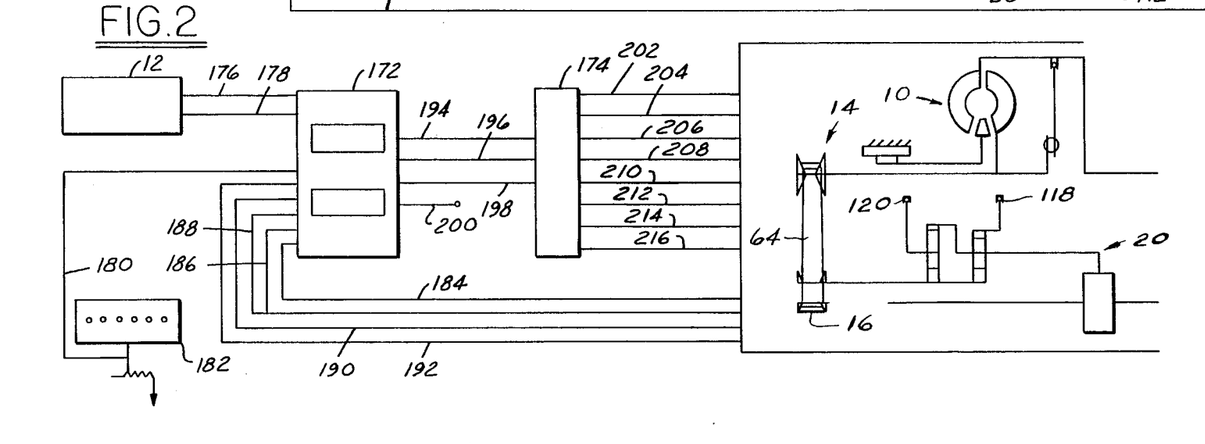
FIG. 2 is a schematic diagram of the electronic and hyraulic components of the control system for operating an automatic transmission.

FIG. 2 shows the various electric input signals supplied to a central processing unit and computer memory 172, the output signals produced by the computer and sent to the control elements of the valve body 174 and the hydraulic actuation signals produced by the valve body. Signal 176 representing the speed of the engine crankshaft and signal 178 representing the effective throttle angle position are taken from the engine and supplied as input to computer 172. A signal 180 representing the position of a PRNDL selector 182, controlled by the vehicle operator; a transmission oil temperature signal 184; a belt pressure signal 186; a lockup clutch pressure signal 188; the primary pulley 14 speed signal 190; and secondary pulley 16 speed signal 192 also are supplied as input to the computer.

Output signals sent from the computer and its associated conditioning circuits to variable force solenoids or to pulse width modulation solenoids located in or adjacent the valve body include: ratio control solenoid signal 194, lockup clutch control solenoid signal 196, line/belt load control solenoid signal 198 and decel disconnect signal 200. In addition, the computer produces signals convertible to digital displays observable by the vehicle operator.

The components of the valve body 174 produce from the three electrical control solenoid signals produced by the computer various hydraulic pressures that include line regulator pressure 202, ratio control pressure 204, belt load pressure 206, lockup clutch pressure 208, converter pressure regulation 210, forward/reverse clutch apply pressure 212, converter feed pressure 214 and line boost pressure 216.

Figure 3A:
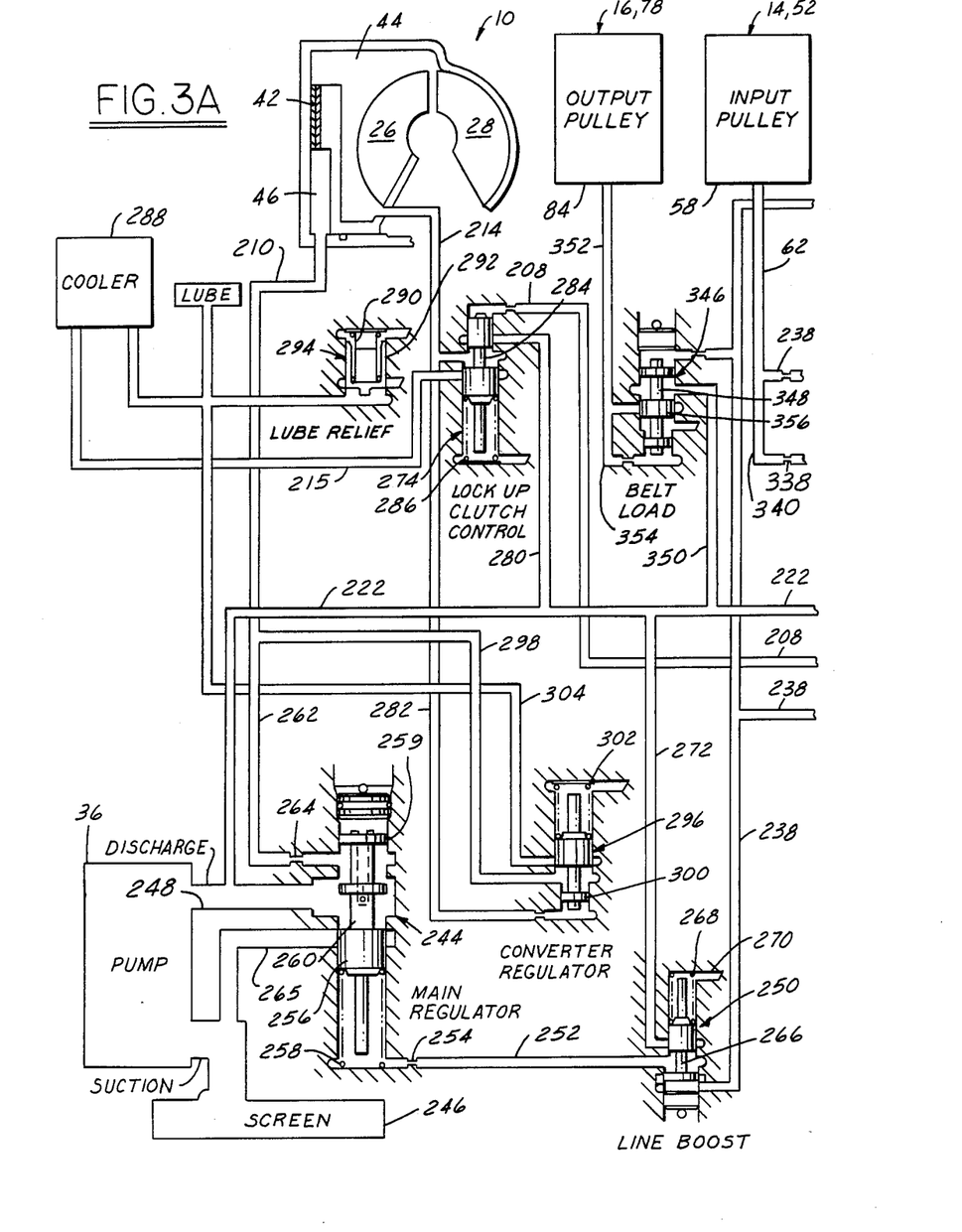
FIGS. 3A and 3B show the details of the hydraulic and electrical control.
Figure 3B:
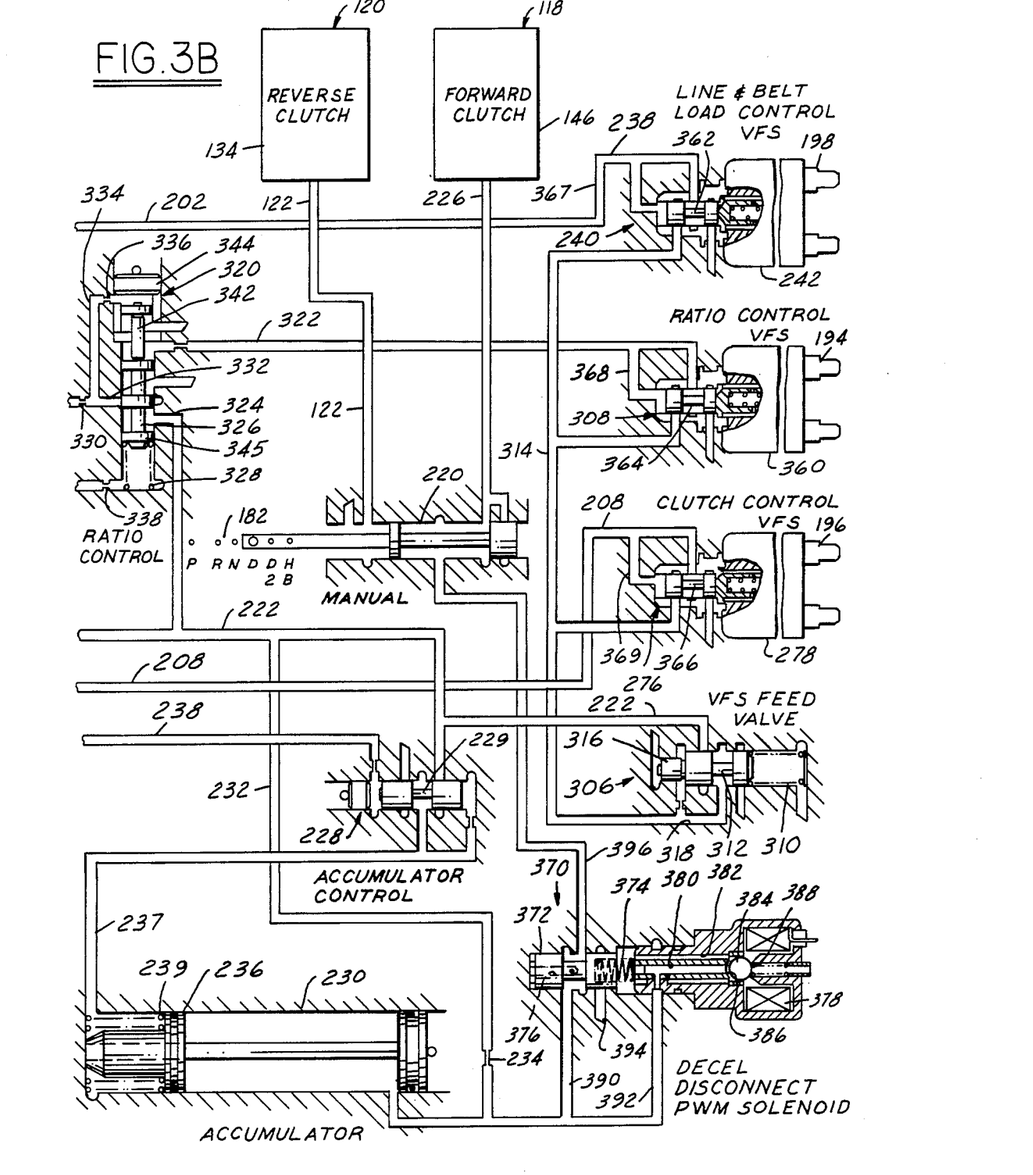

Referring to FIGS. 3A and 3B, through manual operation of the PRNDL selector 182, the vehicle operator controls the position of a manual valve 220, which is a six-position, two-land valve that provides park, reverse, neutral, drive, drive 2, and hill brake HB operation. When the manual valve is in the park position, reverse clutch 120 and forward clutch 118 are vented at the manual valve. When the manual valve is in the reverse position, the forward clutch is vented at the manual valve and regulated line or discharge pressure is supplied through lines 222, 232 and 396 to the manual valve. Input is directed to cylinder 134 of the reverse clutch through line 122. When the manual valve is in the neutral position, the reverse and forward clutches are exhausted at the manual valve. When the manual valve is in the drive, drive 2 or HB positions, the reverse clutch is vented and the forward clutch is pressurized from line 396 through line 226.

Forward Clutch and Reverse Clutch Actuation

The valve body includes an accumulator control valve 228 and an accumulator 230, which rapidly fills alternately the reverse and forward clutches 120, 118. Control valve 228 provides flow control to the accumulator as a function of a magnitude of the throttle angle, as determined by computer input signal 178 and in accordance with the control pressure output by line and belt load control valve 240. After starting the engine with the manual valve in the neutral position and before the PRNDL is moved to a forward drive position, the discharge side of the pump is connected by line 222 to the input of valve 228 and by line 232 through orifice 234 to a first end of accumulator 230, whose piston 236 is moved thereby to the left end of the accumulator cylinder as it is filled with fluid. Fluid remaining in the cylinder at the left side of the piston is vented from the second accumulator end through line 237, whose pressure forces the spool of valve 228 to the left end of the valve and closes input line 222. Springs 239, arranged coaxially and in parallel, bias piston 236 toward the first end of the accumulator. The forward and reverse clutch cylinders 146, 134 are exhausted through manual valve 220.

Then, when a forward drive position is selected, manual valve 220 opens forward clutch cylinder 146 to the discharge side of the pump through decel disconnect valve 370, which includes a spool 372 biased by a spring 374 to the position in FIG. 3B; a feedback passage 376 in the spool; solenoid 378; concentric axial passages 380, 382; ball 384; seat 386 and plunger 388. Passages 390 and 392 connect the accumulator and the source of line pressure to valve 370. When solenoid 378 is deenergized, ball 384 moves off seat 386 and opens passage 382 and 392, thereby aiding spring 374 to move spool 372 to the position of FIG. 3B. This fills cylinder 146 of forward clutch 118 from the discharge side of the pump and concurrently from the accumulator. The fluid is forced from the first end of the accumulator because accumulator co valve 228 receives control pressure in lines 202, 238 from belt/line control valve 240 when a command signal from the computer is applied to the windings of solenoid 242 in response to a shift of the PRNDL to a forward drive position from the neutral position and an increase in engine throttle position. The control pressure in line 202 forces spool 229 rightward, closes the connection between line 237 and the vent port of valve 228, and opens line pressure to the second end of the accumulator through line 237 and valve 228.

This action forces piston 236 rightward and adds the flow from the accumulator to the flow through 232 and orifice 234 to produce a higher flow rate to clutch 118 for rapid filling of clutch cylinder 146 until the clearance among the clutch piston, friction parts and pressure plate is taken up. Thereafter, clutch pressure is maintained with the lower flow rate through orifice 234, valve 370 and manual valve 220 in accordance with the force of forward clutch return spring 148. In this way, the computer signal to solenoid 242 regulates the forward clutch pressure by establishing the pressure output from control valve 240 during the return or filling stroke of piston 236 from the right side to the left of cylinder 230. The first control pressure in lines 202, 238 regulates the pressure in line 237 and, in combination with the force of springs 239, regulates the pressure in the clutch and in the accumulator as it fills again after the clutch is engaged.

If manual valve 220 is moved to the reverse position, clutch cylinder 146 is vented through valve 220 as the PRNDL selector moves to the neutral position; then the reverse clutch cylinder 134 is filled rapidly with flow through orifice 234 and from accumulator 230 through lines 390, 396 and 122. When reverse drive is selected, the computer produces a signal to the windings of solenoid 242, which moves spool 229 of control valve 228 to the right, thereby opening line 222 to the second end of the accumulator and forcing, with the force of springs 239, fluid from the right hand side of piston 236.

If while clutch 118 is engaged and the vehicle is at high speed, the operator abruptly applies the wheel brakes, the transmission will attempt to move to the lowest drive ratio by moving the radial position of the drive belt on the pulleys. However, it is unlikely that a shift to the lowest drive ratio will be completed because the drive belt cannot move radially on the pulleys after their rotation is stopped by the drive wheels being fully stopped. An attempt to accelerate the vehicle with the belt pulley system operating at a high drive ratio would be unacceptable. To permit the transmission to downshift to the lowest drive ratio following rapid hard braking of the drive wheels, the forward clutch pressure is controlled following this condition through operation of the decel disconnect solenoid, which receives a pulse width modulated PWM signal applied to its winding from the computer output when the hard braking condition is detected from the values supplied as input to the computer.

When the winding 378 of solenoid-operated valve 370 is energized, ball 384 closes the connection between passages 380 and 382, thereby removing the pressure force on land 374 and permitting the spool to move rightward, thereby closing the connection between lines 390 and 396 to cylinder 146 and venting cylinder 146 through port 394. Thereafter, a PWM signal on winding 378 opens the connection between passages 380 and 382 and reimposes a pressure force on land 374 in accordance with the duty cycle of the PWM signal to regulate a low pressure output to line 396 and the clutch cylinder 146. A pressure of 5 psi output by valve 370 produces a force on clutch piston 144 that exceeds slightly the force of clutch return spring 148 sufficiently to hold the clutch plates 136, 138 in contact but without transmitting torque through the clutch.

Before or shortly after the operator disengages the foot brakes and depresses the accelerator pedal to accelerate the vehicle, the belt pulley will have shifted to the lowest drive ratio. Valve 370 is used to control the rate of pressure rise in clutch cylinder 146 to produce smooth engagement. Then the signal is removed from solenoid 378 and the forward clutch is pressurized with slight flow through orifice 234 from the line pressure source and through valves 370 and 220.

Line pressure and Converter Feed Pressure

The suction side of the fixed displacement pump 36 is supplied with hydraulic fluid from the sump through a screen 246, and the discharge side of the pump is connected by line 248 to the main regulator valve 244. The output from line boost valve 250 is carried in line 252 through orifice 254 and produces a pressure force on land 256, which combines with the force of spring 258 to oppose a net pressure force acting downward on land 259 of spool 260 to regulate the converter regulated feed pressure carried in line 262. If the pump discharge pressure is too high, spool 260 moves downward and connects line 248 to suction line 265, thereby reducing the pump pressure. If discharge pressure is too low, spool 260 moves upward to the effect of line boost pressure and the force of spring 258, thereby sealing vent line 265 and allowing the discharge pressure to rise. Orifices 254 and 264 are provided to improve damping.

Line boost valve 250 includes a spool 266 biased downward by a spring 268, a vent port 270, input line 272 connected by line 222 to the discharge side of the pump and an output port connected by line 252 to the end of regulator valve 244. Line boost valve 250 is used to regulate line boost pressure as a function of the line and belt load control VFS pressure carried in lines 238 and 202. The output from the line boost valve is an input to the main regulator valve 244, which is used to increase line pressure in accordance with the magnitude of engine torque. When line control VFS pressure in line 238 is between zero and a first predetermined pressure, boost valve 250 is not regulating and line control VFS pressure is ported directly to the main regulator valve in line 252. When VFS pressure is equal to or greater than the first predetermined pressure, spool 266 moves upward against the force of spring 268 and line boost pressure in line 252 is regulated in accordance with line control VFS pressure which varies with engine torque.

Lockup clutch control valve 274 is an unbalanced regulator valve used to modulate lockup clutch pressure in lines 214 and 282 as a function of the lockup clutch control VFS pressure carried in line 208. The lockup clutch control VFS pressure is produced as output from the clutch control VFS valve 276 in accordance with a signal applied to the terminals 196 of clutch control variable force solenoid 278 for producing fluid flow to the clutch. The lockup clutch pressure causes the friction surfaces of lockup clutch 42 to engage and is modulated over a pressure range by modulating lockup clutch control VFS pressure. The minimum lockup clutch pressure is supplied in lines 282 and 214 to converter cylinder 44 when valve 274 is wide open, i.e. when lockup clutch control VFS pressure carried in line 208 is a maximum. When this occurs, spool 284 moves downward against the force of spring 286 and the clutch control valve 274 exhausts to the lube circuit through the cooler 288. Lube pressure is set at a low value determined by the spring 290 and the area of piston 292 of the lube relief valve 294. This sets the minimum pressure in converter cylinder 44, which opposes the effect of pressure within passage 46 of lockup clutch 42.

The lockup clutch control VFS pressure declines as the engine throttle opens, thereby permitting spool 284 to regulate the pressure to lines 214 and 282 and cylinder 44 from the pressure in line 280.

Converter regulator valve 296 is an unbalanced area valve used to regulate converter feed pressure as a function of lockup clutch pressure supplied from clutch control valve 274 through line 282. When the lockup clutch pressure force on clutch 42 is greater than the converter feed pressure force, lockup clutch 42 is engaged and the torque converter is disabled. However, when converter feed pressure force on clutch 42 is greater than lockup clutch pressure force, the torque converter is operative. When lockup clutch pressure is below 10 psi, converter feed pressure is equal to line pressure less the pressure drop across orifice 264, but as lockup clutch pressure increases, the force it produces on land 300 acting in opposition to the force of spring 302 opens converter feed line 304 and line to lube relief valve 294 and regulates the converter feed pressure inversely as lockup clutch pressure increases.

Converter Lockup Clutch System Operation

When the transmission is operating in converter mode, converter feed pressure is supplied from regulator valve 244 through orifice 264, line 262, 210, passage 46 and lockup clutch 42 to torque converter 10. This pressure disengages the friction surfaces of clutch 42 because the pressure force tending to engage clutch 42 is relatively low. The lockup clutch control VFS pressure supplied in line 208 to clutch control valve is high; therefore spool 284 closes line 208 and opens converter line 214 from the converter to cooler feed line 215. Relief valve 294 sets the maximum pressure in line 215 cooler and the lube circuit at 10 psi. Because converter feed pressure is high relative to lockup clutch pressure, converter regulator valve 296 regulates converter feed line 298 by dumping fluid to the lube relief valve when converter feed pressure exceeds 50–60 psi.

When the transmission operates with the torque converter open, lockup clutch control VFS pressure falls through operation of clutch control VFS valve 276 in accordance with the signal applied to terminal 196 of solenoid 278. This causes clutch control valve 274 to close the connection between converter line 214 and cooler feed line 215, and to regulate a rising lockup clutch pressure in lines 214 and 282 on the basis of clutch control VFS pressure and the force of spring 286. This regulated pressure is imposed on regulator valve 296, which drops converter feed pressure by opening line 298 to relief valve 294 through line 304.

This action causes converter feed pressure in line 210 and passage 46 to fall and lockup clutch pressure in line 214 and cylinder 44 to rise. Thus the converter gradually is supplied with fluid from the clutch control valve rather than from the main regulator valve. When the force on clutch 42 due to lockup pressure in cylinder 44 exceeds the force due to converter feed pressure, clutch 42 engages, the converter is locked up and its impeller and turbine are connected mechanically, rather than hydrodynamically.

VFS Feed Valve

The variable force solenoid VFS feed valve 306 is an unbalanced area pressure regulator valve used to regulate pump discharge pressure to a magnitude suitable for use by the VFS valves 240, 276 and 308. The force of spring 310 moves spool 312 to the fully opened position, thereby connecting regulated line pressure in line 222 to the VFS feed line 314; provided line pressure is below a predetermined value. When that value is exceeded, the pressure force developed on land 316 by fluid fed back through line 318 moves spool 312 against the force of spring 310 and closes the connection between line pressure 222 and supply line 314, thereby limiting the VFS feed pressure to about 90 psi.

Ratio Control System

Ratio control valve 320 is a pressure compensated flow control valve used to control hydraulic flow into and out of cylinder 58 of the primary belt pulley 14 to change the drive ratio of the belt-pulley system. When ratio control VFS pressure produced by solenoid-operated valve 308 and supplied to ratio control valve 320 through line 322 is below a predetermined pressure, regulated line pressure from the discharge side of the pump is directed to the primary pulley cylinder 58 through the ratio control valve, line 62 and orifice 330 to produce an overdrive ratio. When ratio control VFS pressure is greater than this predetermined magnitude, regulated line pressure is directed away from cylinder 58 and cylinder 84 of the output pulley 16 is pressurized to produce a shift to a lower drive ratio. The output pressure range of the ratio control VFS solenoid valve 308 is zero to 90 psi. When commanding a shift to a higher drive ratio than the current drive ratio, the VFS signal pressure range available is approximately 25 psi. When commanding a shift to a lower drive ratio, the VFS signal pressure range available is 65 psi. Therefore, greater signal response is available when making a wide open throttle angle ratio change to underdrive operation.

Ratio control valve 320 includes line pressure line 324 communicating with the discharge side of the pump, a first spool 326 biased upward within the valve chamber by spring 328, an orifice 330 in the output line 332 through which primary pulley cylinder 58 is supplied, feedback line 334, an orifice 336, orifice 338 in feedback line 340, and a valve element 342 held by hydraulic pressure force on land 344 in contact with spool 326.

Pressure compensated flow control is incorporated in ratio control valve 320 so that flow into and out of primary pulley cylinder 58 is directly regulated by the VFS ratio control solenoid electrical signal and pressure in line 322 independently of pressure changes upstream and downstream from the valve. The valve is inherently self compensating to either pump discharge pressure or primary pulley cylinder pressure variations. For example, if VFS ratio control pressure is decreased to 20 psi, spool 326 moves upward, thereby connecting regulated line pressure in line 324 to line 322 and cylinder 58 through metering orifice 330. Spool 326 will stop moving upward when the force balance is reestablished. In the steady-state condition, the pressure drop across orifice 330 is proportional to the VFS control pressure. The primary pulley will move toward its overdrive position at a speed related to the fixed flow rate across orifice 330.

If displaceable sheave 52 of the input pulley assembly 14 encounters increased axial friction as it moves to a lower drive ratio position, the pressure in primary pulley cylinder 58 will increase, thereby tending momentarily to decrease the pressure drop across orifice 330 and to increase the pressure on both sides of orifice 330. The pressure in feedback lines 334 and 340 now apply a reduced differential pressure on lands 344 and 345, respectively, which causes spool 342 to move upward. This movement further opens the connection between lines 324 and 62 and increases the flow to cylinder 58 back to the original flow because ratio control VFS pressure is maintained constant during this self-compensation. The pressure drop across orifice 330 returns to its original value. Valve 320 then is renulled at the original flow rate across orifice 330, thereby reestablishing the initial flow rate into cylinder 58. The same self-flow compensation occurs with respect to disturbances in regulated line pressure in line 324.

Belt Load

Belt load valve 346 is an unbalanced pressure regulator valve used to control belt clamping load by controlling the pressure on the displaceable sheave 78, which moves in accordance with pressure supplied to cylinder 84 of output pulley 16. The belt clamping load requirement on the secondary pulley is a function of engine torque and the drive ratio to be produced by the belt-pulley system. Execution of a control algorithm in computer 172 determines the clamping loads, which are then converted to a belt load first control VFS pressure carried in lines 202 and 238 to belt load valve 346. Pressure in line 238 produces a force on spool 348 tending to open the connection between line pressure in line 350 and cylinder 84, which is supplied through line 352. pressure carried in feedback line 354 produces a lesser force on spool 348 that opposes the force resulting from the pressure produced by line and belt load control VFS valve 240. Therefore, belt load pressure supplied to cylinder 84 is greater than VFS pressure.

The secondary pulley servo, which includes cylinder 84 and sheave 78, holds maximum engine torque while the torque converter 10 is operating in stall condition and at maximum belt underdrive ratio. The secondary sheave clamping loads induce axial loads in the primary sheave due to belt tension.

The first second and third variable force solenoids 242, 278 and 360 produce an outward flow from valves 240, 276 and 308, respectively, that is proportional to the input current supplied to the windings of the respective solenoids through terminals 198, 194 and 196. VFS feed valve 306 supplies regulated line pressure through line 314 to each of the valves operated by the variable force solenoids. Each of the valves includes a spool 362, 364, 366 that opens and closes communication between line 314 and the outlet line 238, 322 and 208 of the respective valve. Each output line has a feedback line 367-369 that maintains the valve spool in contact with the plunger whose position is controlled by the current supplied to the winding of the respective solenoid. The position of the spool determines the flow rate of hydraulic fluid from the valve in proportion to the magnitude of current supplied to the solenoid windings.

Command Clutch Slip Ramp

Figure 6:
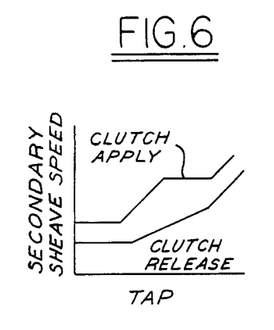
FIGS. 6–11 show data and schedules used to define the clutch slip rate and final clutch slip produced by the slip control system of this invention.

Stored within the computer memory are data, an algorithm whose execution produces a command to execute the slip control, and several variables needed to define the time rate of change of slip across the clutch and the clutch slip to be maintained after the slip control is executed. FIG. 6 shows the relationship between engine throttle angle (TAP) and vehicle speed, stated in terms of the speed of the output pulley, from which the initial slip command $N_S$ is produced provided the current operating point is located above the clutch apply curve and the slip control is currently inactive, and from which the $N_S$ command is terminated provided the current operating point is located below the clutch release curve and the slip control is currently active.

Figure 7:
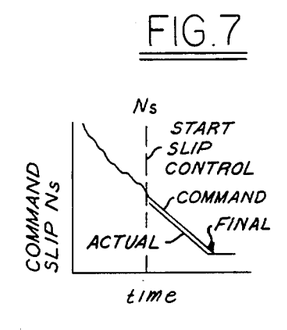
Figure 8:
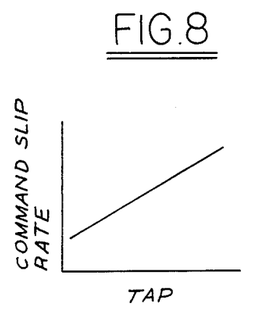

In a transmission having a torque converter lockup clutch, the computer slip and clutch slip, which are identical values, decline with time as the vehicle accelerates before the slip control is called into operation. Preferably near the converter coupling point when the control operates a converter lockup clutch, or at a suitable time when this control operates other clutches, a slip rate that varies with time is commanded as a function of the current throttle angle. The data of FIG. 8 defines a constant time rate at which the slip is to decrease on the basis of the current throttle angle supplied as input to the computer on line 178. FIG. 7 shows an irregular decrease in slip, prior to the occurrence of the slip control command $N_S$, which occurs as the vehicle accelerates. After the $N_S$ signal is produced, the control of this invention defines a commanded slip rate, and the actual slip across the clutch is seen to follow the commanded slip from the beginning of the slip control procedure until its conclusion.

Figure 9:
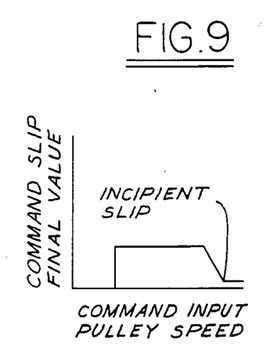
Figure 10:
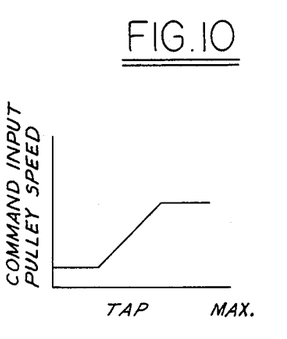

The commanded slip to be maintained after the slip control is executed is defined with reference to the data of FIG. 10 and the schedule of FIG. 9. The current throttle angle is used to determine the corresponding speed for the input pulley to be commanded. The final value of slip, at which the slip ramp function terminates, is determined on the basis of the commanded input pulley speed. When the speed of the output element of the clutch, such as the converter turbine 28 or input pulley 14, is low, the clutch may be required to be disengaged; in an intermediate range of commanded clutch output element speed, the slip may be required to be a constant value so that tip in and backout vibrations can be damped through slipping contact on the clutch surface; at high speed, where throttle angle is high, the clutch slip may be maintained at 1-2 rpm, an incipient slip value that permits immediate engagement of the clutch without appreciable delay.

Figure 11:
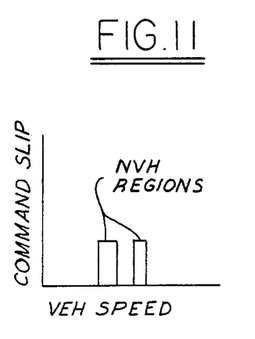

FIG. 11 shows that a commanded slip final value can be redefined as a function of vehicle speed, or its equivalent output pulley speed, if actual driving experience indicates the occurrence of NVH vibrations at discrete ranges of vehicle speed.

The components and operation of the slip control that produces the commanded slip from the clutch lockup hydraulic pressure are described next with reference to FIGS. 4 and 5.

Clutch Slip Feedback Control

Figure 5:
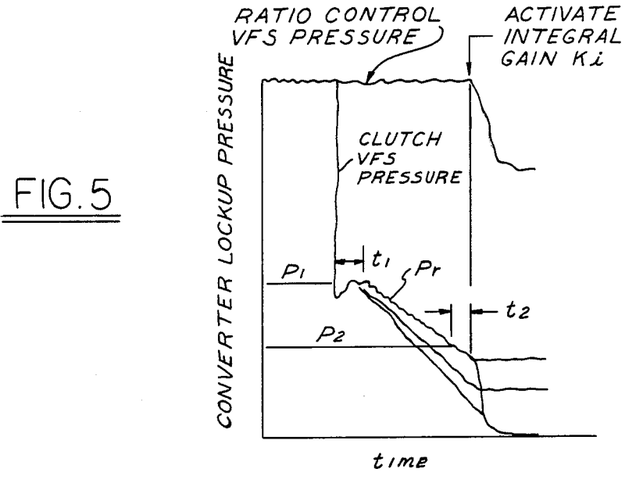
FIG. 5 is a graph showing the change in the lockup clutch control VFS pressure during the engagement of the torque converter lockup clutch.

FIG. 5 shows the variation of the lockup clutch control VFS pressure produced by solenoid valve 276 in accordance with the current applied to the windings of solenoid 278 by the computer feedback control and associated conditioning circuitry. As the vehicle begins to accelerate from a standing start, the torque converter will be unlocked and the belt-pulley system will be set for operation at the maximum underdrive position. As the engine speed increases, a schedule stored in computer memory that relates commanded engine speed to the throttle angle is consulted to produce a command that the torque converter be locked up. At time $t_0$, before the lockup signal is present, both the ratio control solenoid 360 and clutch control VFS solenoid 378 produce their maximum pressure, approximately 90 psi. When the lockup signal occurs, the lockup clutch control VFS pressure in line 208 reduces to $p_1$ and is held there until $t_1$. Then, a decreasing pressure ramp $p_r$, whose slope is determined in accordance with the slip ramp definition and feedback control, is started to engage clutch 42. The clutch becomes fully engaged when lockup clutch control VFS pressure causes the solenoid feed pressure in line 210 to decrease and lockup clutch pressure in line 214 to increase. As the control VFS pressure increases further, the differential pressure across the lockup clutch causes the clutch to engage as a function of engine inferred torque. At time $t_2$ after the clutch 42 is engaged, control VFS pressure is dropped to zero or is held at a positive pressure.

The variables $p_1$, $t_1$ and $t_2$ are independent calibration variables and are not a function of another variable. $P_r$ and $p_2$ are functions of inferred engine torque.

During the acceleration period, an engine speed versus throttle angle schedule stored in memory accessible to the computer processor will maintain transmission operation at the lowest drive ratio. However, the commanded engine speed cannot be obtained and a large integration error will result in the engine speed control. This could result in overshoot and a disturbance when the controller is out of saturation. To prevent this condition, the engine speed controller integral gain $K_i$ must be kept at zero until $t_2$ has expired during the lockup sequence.

Figure 4:
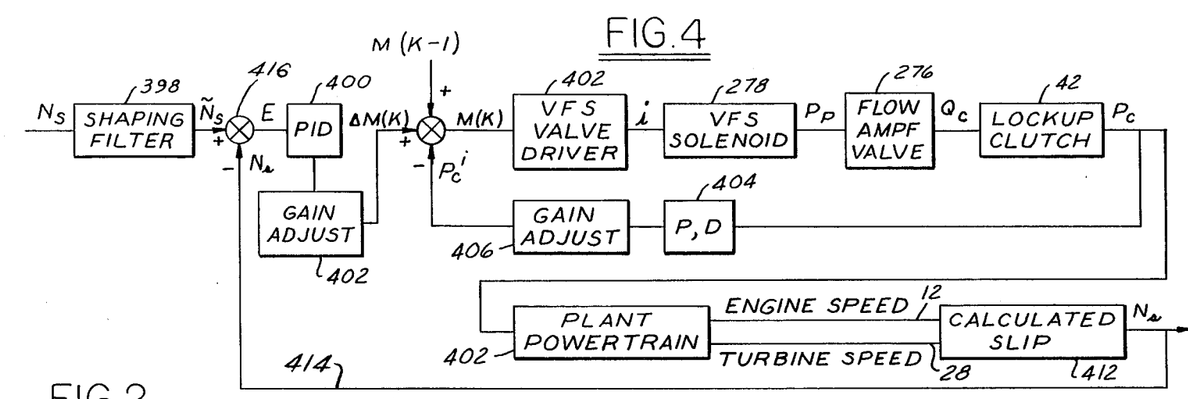
FIG. 4 is a diagram of the closed loop lockup clutch slip control according to this invention.

The servo block diagram of the lockup clutch slip controller is shown in FIG. 4. If during a tip-in backout, or harsh NVH operating condition, the converter lockup clutch is modulated to create a small amount of slip, the difference between the speed of the engine and the speed of input pulley 14, the torque converter will be active and the harsh effect of a solid driveline is minimized. The control of FIG. 4 includes an outer loop calculated slip feedback and a minor loop lockup clutch pressure feedback to improve damping and increase bandwidth.

When the control strategy requires the clutch to slip, the slip command $N_S$, produced as output by the computer 172, is passed through a rolling average shaping filter 398 to smooth the input command. The output of the shaping filter and the actual calculated slip $N_s$ are subtracted at a summing junction to produce an error signal. The error signal E is phase-compensated in a proportional, integral, differential PID compensator 400 and then adjusted for gain 402. The output of the gain (adjuster) block $\Delta M(K)$ is an incremental error duty cycle that is added to the most recent duty cycle $M(K-1)$ and to the minor loop feedback signal $P_c'$. The total duty cycle M(K) is a pulse width modulated PWM signal that is passed through a third order Butterworth valve driver filter 403 in which the pulse width modulated signal is converted to a current i, which is proportional to the duty cycle.

Current drives the variable force solenoid VFS 278, whose output pressure $p_p$ is proportional to the input current. The output pressure acts on a flow amplifier valve 276, whose output flow rate $Q_c$ is proportional to the input pilot pressure. Flow is directed to the lockup clutch 42 wherein lockup clutch pressure $p_c$ is developed. By increasing lockup clutch pressure $p_c$, slip is decreased; conversely, by decreasing lockup clutch pressure, slip is increased. The actual lockup clutch pressure $P_c$ is sensed with a pressure transducer whose output is directed through a proportional, differential compensator 404 and gain adjust compensator 406 to improve actuator bandwidth and damping.

Within the powertrain that includes the engine shaft, transmission, differential and drive shafts, signals representing the speed of the engine crankshaft 12 and the speed of turbine 28 are produced. The signal representing the current actual slip, the difference between the current speed of the engine and the current turbine speed, is calculated at 412, fed back on line 414 and summed with the filtered input command signal at summing junction 416.

Rolling average filter 398 is a low pass, first order filter. The difference equation implemented in software for PID compensator 400 is $$f(K) = K_p[N_e(K) - N_e(K-1)] + K_d[N_e(K) - 2N_e(K-1) + N_e(K-2)] + \ldots K_i N_e(K) \quad (1)$$

where $N_e$ is the speed error, f is the output of the PID compensator, K is the current sample, K−1 is the immediately preceding sample, K−2 is the sample that preceded the immediately preceding sample, and $K_p$, $K_d$ and $K_i$ are proportional, derivative, and integral gains, respectively.

The VFS valve driver 403 is a third order Butterworth filter that converts the digital pulses of the duty cycle to a DC current whose magnitude is proportional to the width of the voltage pulse signal M(K).

The different equation of the PD compensator 404 is $$P_c'(K) = K_d[P_c(K - 2P_c(K-1) + P_c(K-2)] \quad (2)$$

Where $P_c'$ is the output lockup clutch pressure signal and $P_c$ is the input pressure signal.

A variable force solenoid was used in this implementation, but the system can be implemented also with lower cost pulse width modulated on/off solenoids. The inner pressure feedback loop increases the system bandwidth and damping but requires a pressure transducer to sense clutch pressure. To minimize cost, the circuit can be implemented without the minor loop by appropriately tuning the PID compensator.

Having described a preferred embodiment of my invention, what we claim and desire to secure by U.S. Letters Patent is:

1. A system for controlling the operation of a slipping clutch for use in the transmission of a motor vehicle comprising:
   a clutch having a driving member and a driven member driveably engaged and disengaged in accordance with the magnitude of lockup clutch pressure developed in the clutch;
   an electrical solenoid-operated valve means for producing hydraulic fluid flow to the clutch;
   means for producing signals representing the magnitude of the speeds of the driving member and the driven member;
   means for calculating a current slip across the clutch and for producing current commanded slip;
   means for producing slip error duty cycle from the current commanded slip and the current calculated slip;
   minor loop feedback means for producing a signal representing the magnitude of lockup clutch pressure;
   means for producing a current duty cycle from the sum of the slip error duty cycle and a previously calculated duty cycle minus the minor loop feedback signal; and
   means for converting the current duty cycle to a signal proportional thereto, and driving the solenoid with said proportional signal and producing lockup clutch pressure in the clutch tending to engage the driving and driven members.

2. The system of claim 1 further including;
   compensator means for phase compensating the slip error duty cycle including a proportional, integral, differential compensator;
   solenoid-operated valve driver means including a third order Butterworth digital filter whose input is a pulse width modulated current duty cycle signal for converting said pulse width modulated current duty cycle signal to an electric current output applied to the winding of the solenoid; and wherein
   the solenoid-operated valve means includes a variable force solenoid driven by the output of the valve driver means and valve means for regulating the pressure supplied to the clutch in accordance with the force developed by the solenoid.

3. The method of claim 1 further including;
   pressure transducer means located in the minor feedback loop for producing a signal representing the lockup clutch pressure; and
   compensator means including a proportional, derivative PD compensator connected to the output of the pressure transducer and a gain adjust compensator connected to the PD compensator for producing said signal representing the lockup clutch pressure.

4. A system for controlling the operation of a slipping clutch for use in the transmission of a motor vehicle comprising:
   a torque converter having an impeller and a turbine arranged in hydrodynamic driving relation and a casing for containing fluid;
   lockup clutch means for driveably engaging and disengaging the impeller and turbine in accordance with the relative magnitudes of a converter feed pressure and a lockup clutch pressure;
   an electrical solenoid-operated valve means for producing hydraulic fluid flow to the clutch;
   means for producing signals representing the magnitude of the speeds of the impeller and the turbine;
   means for calculating a current slip across the clutch and for producing a current commanded slip;
   means for producing slip error duty cycle from the current commanded slip and the current calculated slip;

minor loop feedback means for producing a signal representing the magnitude of the lockup clutch pressure;

means for producing a current duty cycle from the sum of the slip error duty cycle and a previously calculated duty cycle minus the minor loop feedback signal; and means for converting the current duty cycle to a signal proportional thereto, driving the solenoid with said proportional signal and producing the lockup clutch pressure in the clutch tending to connect the impeller and turbine.

5. The system of claim 4 further including a converter feed pressure producing and controlling means that includes:

a hydraulic pump having a suction side connected to the transmission sump and a discharge side adapted for connection to the system;

means for producing a first control pressure; and main regulator valve means connected to the discharge side of the pump for regulating converter feed pressure in accordance with the first control pressure.

6. The system of claim 5 wherein the first control pressure producing means includes:

a source of regulated line pressure;

means for producing a first electrical command signal;

a first electrical solenoid connected to the first electrical command signal producing means; and line control valve means connected to the source of regulated line pressure for producing the first control pressure in accordance with the first electrical command signal applied to the first electrical solenoid.

7. The system of claim 5 further including a line boost valve means connected to the first control pressure, to the discharge side of the pump, and to the main regulator valve means for directing the first control pressure to the main regulator valve when the first control pressure is in a range bounded by zero and a first predetermined first control pressure and for regulating control pressure supplied to the main regulator valve when the first control pressure is equal to or greater than said first predetermined first control pressure.

8. The system of claim 4 wherein the lockup clutch means includes:

a source of low pressure;

a source of regulated line pressure;

a lockup clutch control valve connected to the source of regulated line pressure, to the source of low pressure, and to the torque converter casing for connecting the casing to the source of low pressure in response to a command to disengage the lockup clutch, and for supplying said lockup clutch pressure from the source of regulated line pressure to the torque converter casing in response to a command to engage the lockup clutch.

9. The system of claim 8 wherein the electrical solenoid-operated valve means includes:

means for producing an electrical command signal;

an electrical solenoid connected to the command signal producing means; and the electrical solenoid-operated valve means connected to the source of regulated line pressure for producing lockup clutch control pressure in accordance with the command signal applied to the electrical solenoid.

10. The system of claim 8 further comprising:

converter regulator valve means connected to the low pressure source, to the converter feed pressure producing means, and to the torque converter casing for opening the converter feed pressure to the low pressure source in accordance with a rise in the lockup clutch pressure in response to a command to engage the lockup clutch.

11. The system of claim 6 wherein the lockup clutch pressure producing means includes:

a port connected to the source of regulated line pressure;

a port connected to a source of low pressure;

a control port connected to a lockup clutch control pressure;

an outlet port connected to the torque converter casing; and a valve spool for opening the connection between the low pressure source and the torque converter casing in accordance with the magnitude of the lockup clutch control pressure, and for regulating the pressure supplied to the torque converter casing in accordance with the magnitude of the lockup clutch control pressure.

12. The system of claim 11 further including a converter regulator valve including:

a port connected to the low pressure source;

a port connected to the converter feed pressure regulating means;

a port connected to the outlet port of the lockup clutch pressure producing means; and a valve spool for closing the connection between the converter feed pressure and the low pressure source when the lockup clutch pressure supplied to the torque converter casing is low, and for opening said connection when the lockup clutch pressure supplied to the torque converter casing is higher.

* * * * *